Feb. 6, 1934.  H. C. LIMA  1,945,533
SELF LOADING TRUCK
Filed Oct. 22, 1931  3 Sheets-Sheet 1
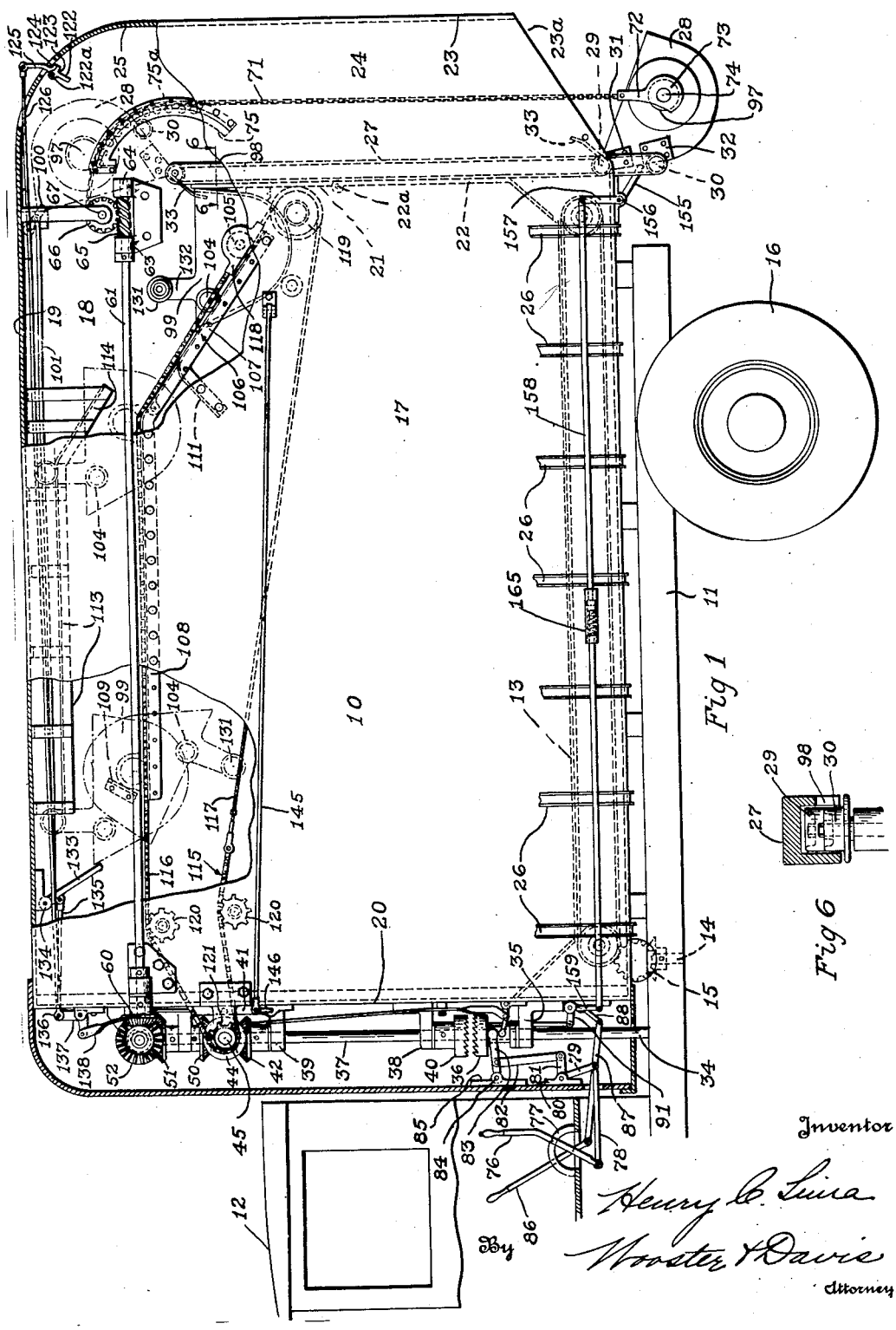

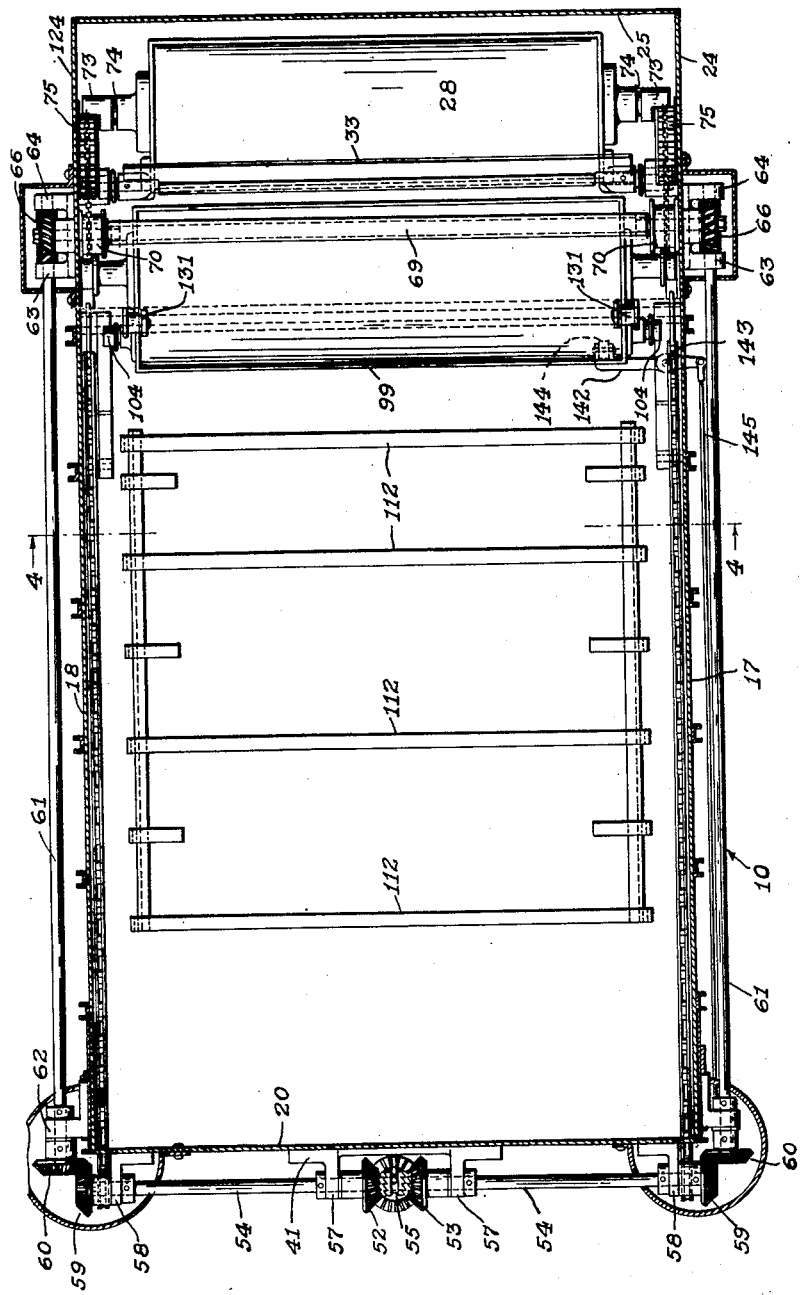

Feb. 6, 1934.    H. C. LIMA    1,945,533
SELF LOADING TRUCK
Filed Oct. 22, 1931    3 Sheets-Sheet 3
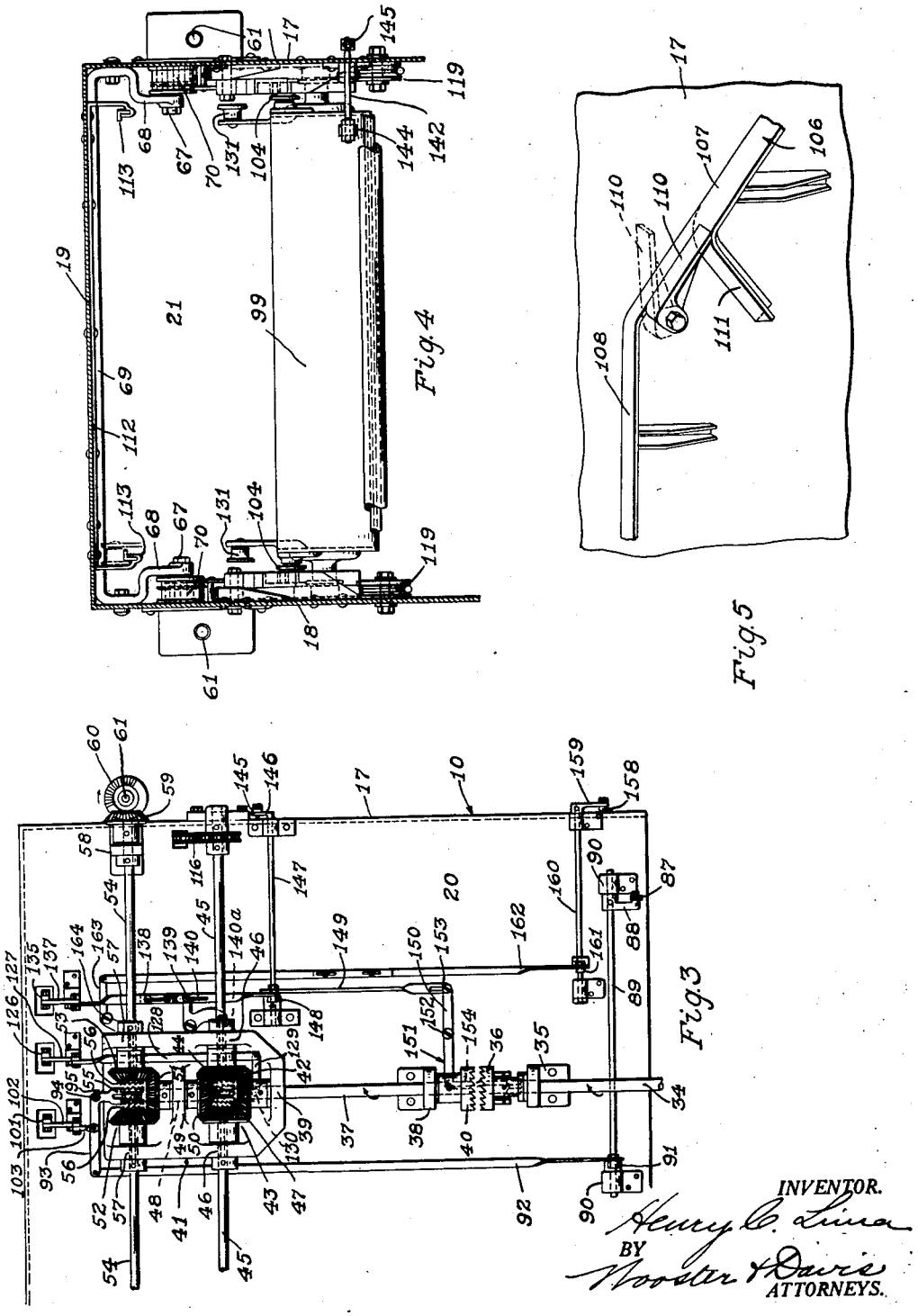

Patented Feb. 6, 1934

1,945,533

UNITED STATES PATENT OFFICE 1,945,533

SELF LOADING TRUCK

Henry C. Lima, Stamford, Conn., assignor to Grace T. Lima, Stamford, Conn.

Application October 22, 1931. Serial No. 570,351

25 Claims. (Cl. 214—67)

This invention relates to new and useful improvements in self loading trucks such as are used in the collection of garbage, ashes and the like.

An object of the invention is to provide a closed body for such trucks together with means whereby the trucks may be rapidly loaded with a minimum of human effort.

Another object is to provide a truck as stated including a closed body having a hood at its rear end, a bucket operable through said hood from a loading to a dumping position, and a trough within the body at the rear thereof to receive material dumped by the bucket and carry such material forwardly in the truck body.

A further object is to provide a self-loading truck including a body, a bucket at the rear of the body, means to operate said bucket between loading and dumping positions, a trough within the body at the rear thereof to receive material as the same is dumped by the bucket, means to operate the trough between its position at the rear of the body and a dumping position forwardly in the body, means operated by the movement of the bucket toward lowering position to set in operation the means for moving the trough, and means operated by the return of the trough to its position at the rear of the body to place the trough operating means in inactive or neutral condition.

Other objects and advantages will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims to which claims reference should be had for a definition of the invention.

In the drawings:

Fig. 1 is a view partly in side elevation and partly in section showing the improved self loading truck;

Fig. 2 is a top plan view of the truck body, the top of the body being removed;

Fig. 3 is a view of a portion of the front end of the truck body showing the control mechanism mounted thereon;

Fig. 4 is a transverse sectional view taken substantially along the line 4—4 of Fig. 2;

Fig. 5 is a detailed perspective view showing a portion of a track employed; and Fig. 6 is a detailed sectional view taken substantially along the line 6—6 of Fig. 1.

Referring in detail to the drawings, at 10 is shown an automobile truck body suitably mounted on a chassis indicated at 11. On the chassis 11 forwardly of the body 10 is a cab 12 to be occupied by the driver of the truck and within which are the controls for the body loading mechanism later to be described. Body 10 is preferably completely enclosed and of metal and may be equipped with a movable load carrying floor or bottom 13 in the form of an endless conveyor as shown in my copending application Serial No. 563,758, filed September 19, 1931. This floor or load carrying bottom 13 may be driven as by a shaft 14 through gearing 15, the shaft deriving power from a suitable power take-off means (not shown) from the automobile engine (not shown).

The body 10 includes side walls 17 and 18, a top 19, and front and rear walls 20 and 21 respectively. Beyond its rear wall 21, in which it may be provided with a hinged gate or door 22 hinged at 22a, the body is formed with a hood 23 open at its lower end 23a and including side walls 24 and a rear wall 25. The inner wall of the hood 23 is formed by the rear wall 21 of the body and as clearly shown in Fig. 1 this wall 21 stops short of the top 19 of the body and the hood communicates with the interior of the body through the space between the top and the upper edge of the said wall 21. If desired, the side walls 17 and 18 of the body may be strengthened as by means of cross sectionally U-shaped beams or channel irons 26.

Mounted on the rear wall 21 adjacent the side edges thereof are a pair of vertical guides 27. These guides 27 are U-shaped in cross section as clearly shown in Fig. 6 and the guides are arranged with their open sides facing one another. Operating through the hood 23 is a bucket 28 having a loading position below the lower open end of the hood as shown by the full lines in Fig. 1. At each of its ends the bucket 28 carries a pair of vertically spaced rollers 29 and 30 the rollers being secured to the bucket as by means of brackets 31 and 32. These rollers are arranged in the vertical guides 27 as shown in Figs. 1 and 6 and the guides are closed at their upper and lower ends, the closed lower end of the guide being engaged by the lower rollers 30 to limit the downward movement of the bucket in its return to loading position after having been dumped.

Owing to the fact that the vertically spaced rollers 29 and 30 are employed the bucket 28 is securely held against tilting while in its normal or loading position. At its inner edge the bucket may carry a flange or lip 33 adapted to perform its function while the bucket is being dumped or emptied. Obviously, the bucket is designed to operate through the hood 23 from its loading position as shown in full lines at the lower end of the hood in Fig. 1 to its dumping position as shown by the dot and dash lines at the upper end of the hood in said figure.

Since the bucket must operate or travel through the hood 23 the parties loading the bucket are readily advised as to the amount and size of the load the bucket is capable of carrying. In old constructions in which a bucket merely dumped through an opening near the top of the body it often happened that a crate or other object too large to go through the opening was placed in the bucket with the result that it jammed when it reached the dumping position. With the present arrangement the hood forms a ready means of indicating to the party or parties loading the bucket when an object is too large to be readily handled by the bucket. In other words clearance space at the top of the hood between the hood and the interior of the body over the top of the rear wall of the hood is sufficient to pass any article which can be placed in the bucket under the lower edge of the hood, and therefore there is no danger of the bucket becoming jammed at the upper end of the hood by a too large object. The hood also has a very important function of enclosing the bucket except when it is in its lowest position and also enclosing the entrance opening to the top of the body and therefore makes the device much more sanitary.

Power for the operation of the present loading mechanism is taken from a power take-off from the motor (not shown) of the truck whereby a relatively short vertical shaft 34 arranged at the forward side of the front wall 20 of the body is driven. This shaft 34 may be supported as by a bearing member 35 and as here disclosed the shaft is arranged about midway between the side edges of the said front wall of the body. To the upper end portion of the shaft 34 there is keyed a clutch element 36, the said element rotating with the shaft and being slidable to a limited extent along the shaft.

A shaft 37 is arranged above the shaft 34 and in vertical alignment therewith and this shaft 37 may be mounted as in bearings 38 and 39. To the lower end portion of the shaft 37 there is keyed a clutch element 40, the said element being fixed on the shaft. Clutch elements 36 and 40 are complemental and are adapted to be engaged whereby to have the shaft 37 driven from or by the shaft 34.

The bearing 39 for the upper portion of the shaft 37 is provided in a relatively large element, as a casting 41. At its upper end above the bearing 39 the shaft 37 carries a bevel gear 42 which bevel gear meshes with a pair of bevel gears 43 and 44. The bevel gears 43 and 44 each carry clutch teeth as shown and these gears are free on a shaft 45 extending transversely of the body and at right angles to the shaft 37. Further, the shaft 45 is mounted in suitable bearings 46 provided in the casting 41. On shaft 45 between the gears 43 and 44 is a shiftable clutch element 47 keyed to the shaft and adapted to be selectively shifted into engagement with the clutch teeth of the gears 43 and 44 whereby to key either of these gears to the shaft 45.

A short shaft 48 mounted in a bearing 49 is arranged above and in alignment with the shaft 37 and at its lower end shaft 48 carries a bevel gear 50 meshing with the bevel gears 43 and 44 whereby movement of said gears 43 and 44 is transmitted to the gear 50. Above the bearing 49 shaft 48 carries a bevel gear 51 meshing with a pair of oppositely arranged bevel gears 52 and 53 mounted to turn on a shaft 54. A clutch element 55 is keyed to the shaft 54 between the gears 52 and 53 and each of these gears carries clutch teeth 56 with which the clutch element 55 may be selectively engaged whereby to key either gear to the shaft 54 whereby movement of the selected gear will be transmitted to the shaft. Shaft 54 may be mounted in bearings 57 in the casting 41.

Toward its outer ends the shaft 54 may be supported in bearings 58 and at its respective outer ends the said shaft is provided with bevel gears 59 meshing with bevel gears 60 on shafts 61 extending longitudinally of the body at the outer sides thereof. These shafts 61 are supported as by bearings 62, 63 and 64 and each at its rear end carries a worm 65, the said worms being arranged on the shafts between the bearings 63 and 64. The worms 65 on the shafts 61 at the respective sides of the body mesh with and drive worm gears 66 on short shafts 67 supported through the side walls 17 and 18 of the body and by brackets 68 connected together and supported as by a cross bar 69 secured to the roof 19 as by riveting or the like.

On the short shafts 67 inwardly of the side walls 17 and 18 of the body are mounted drums 70 to which are secured the upper ends of chains 71 the lower ends of said chains being secured to arms 72 in turn carried by members 73 pivoted on short shafts 74 carried by the end walls of the bucket 28. Adjacent the upper end of the hood 23 the chains 71 pass over arcuate guide-members 75 suitably secured to the side walls 24 of the hood. These guide members preferably include anti-friction rollers 75a over which the chains run and which reduce the friction and give easier operation.

Hand operated means are provided for shifting the clutch element 36 upwardly into engagement with the clutch element 40 whereby the shaft 34 will have its movement transmitted to the shaft 37. The control for this means is here disclosed as a hand lever 76 arranged in the cab 12 and movable in connection with a quadrant 77. To the lower end of lever 76 there is pivotally secured a link 78 which at its rear end is pivotally secured to the lower end of the arm 79 of a bell crank pivotally mounted on a bracket 80. To the outer end of the arm 81 of this bell crank is pivotally secured the lower end of a link 82 the upper end of which is pivotally secured to an arm 83 intermediate the ends of the arm. Arm 83 or yoke 83 is pivotally secured as at 84 to a bracket 85 and this yoke has its opposite ends disposed under the clutch element 36. Obviously, forward movement of the hand lever 76 will result in rearward movement of the link 78 resulting in the bell crank being swung around its pivot to move the link 82 upwardly and swing yoke 83 about its pivot 84 whereby to shift the clutch element 36 into engagement with the clutch element 40.

Engagement of the clutch elements 36 and 40 will result in the gear 42 driving the gears 43 and 44 which in turn will transmit their movement to the gear 50 driving the shaft 48 and the gear 51. Gear 51 will drive the gears 52 and 53 on the shaft 54, the said gears 52 and 53 being driven in opposite directions. Means are also provided in the cab 12 for shifting the clutch element 55 into engagement with the gear 52 whereby to have the shaft 54 driven, such movement of the shaft resulting through the means previously described in the drums 70 being driven in a direction to cause the chains 71 to be wound about the drums in a manner to raise the bucket 28 from its loading to its dumping position.

This means for shifting the clutch element 55 includes a hand lever 86 at its lower end pivotally connected with a link 87 which in turn at its rear end is pivotally connected with an arm 88 rigid with a cross bar or shaft 89 mounted in bearings 90. (See Fig. 3). Also rigid with the rod 89 is an arm 91 to the outer end of which is secured a vertically extending rod 92 which at its upper end is pivotally secured to an arm of a lever 93 pivotally mounted intermediate its ends as at 94 and is connected with a yoke member 95 adapted to shift the clutch element 55. On the lever 86 being drawn rearwardly link 87 will be drawn forwardly and acting through the arm 88 will rock the rod 89 which acting through the arm 91 will shift the link or connecting member 92 upwardly. This will result in the lever 93 having its outer end moved upwardly and the yoke member 95 will shift the clutch element 55 into engagement with the clutch teeth 56 of the gear 52.

From the foregoing it will be seen that the bucket 28 remains stationary in loading position until the operator in the cab 12 shifts the lever 76 and then the lever 86. The drums 70 will then be rotated and the chain wound thereon resulting in the bucket 28 being moved upwardly in the hood 23. On each end of the bucket is a roller 97 and as the bucket reaches its upper position these rollers engage the arcuate guides 75. When the parts have reached this point the lower rollers 30 in the vertical guides 27 have reached an opening 98 through the walls of the guides. Fig. 6 clearly shows this opening 98 and from this figure it will be noted that the roller 30 is of such length as to move out of the guide way through the opening 28 while the upper roller 29 is of such length that it will not pass through the opening or notch 98.

As the upper rollers 29 engage the top of guides 27 their upward movement is arrested, and as the chains still continue to move upward the bucket is swung about rollers 29 as a pivot which is permitted by the rollers 30 passing through the openings or notches 98 in the vertical guides 27 resulting in the bucket being swung about an arc the center of which is determined by the rollers 29 engaging the closed upper ends of the guides 27. In this arcuate or dumping movement of the bucket the rollers 97 engage the outer surfaces of the arcuate guides 75 whereby the bucket has a steady movement. The lip or flange 33 passes over the upper edge of the wall 21 of the body and forms a chute over which the refuse or other matter in the bucket slides into the trough 99.

Within the body 10 and having a normal position adjacent the rear wall 21 thereof is a second bucket or trough 99, the same being positioned to receive material dumped by the bucket 28. As the bucket reaches its dumping position it operates means to shift the clutch element 55 from the gear 52 to the gear 53 whereby to reverse the direction of the drive of the drums 70 whereby the bucket is lowered or returned to its loading or normal position. This means will later be described. During its return movement to loading or normal position the bucket engages a means to set in operation means for moving the trough 99 from its normal position to a dumping position forwardly in the body and this means will later be described also.

Pivotally supported by a bracket on the inner side of the roof or top 19 is a trip lever 100 positioned to be engaged by the bucket 28 as the bucket moves to its extreme dumping position as shown in Fig. 1. Pivoted to the lever 100 intermediate the ends thereof, is a push rod or connecting member 101 which at its outer end is pivotally connected with a bell crank 102 operating through a link 103 connected to lever 93 to shift the clutch element 55 as described from engagement with gear 52 to engagement with gear 53. This will, of course, as above suggested result in the drum 70 being driven in reverse direction whereby the bucket 28 will be lowered to normal position.

In its normal position the bucket 99 is supported by rollers 104 and 105 resting on track members 106. It will be understood that these track members are arranged one against the inner surface of each of the side walls 17 and 18 of the body and that the rollers 104 and 105 are provided at each end of the trough 99. At its rear portion the track 106 inclines downwardly as at 107 and forwardly of this inclined portion the track is arranged horizontally as at 108, (Figs. 1 and 5) a suitable stop means 109 being arranged at the forward end of the track. In its inclined portion the track is provided with a one way gate 110 normally disposed in line with portion 107 and to cover an inclined return portion 111 the purpose of which will later appear.

Supported by cross bars 112 riveted or otherwise secured to the top 19 are suspended track ways 113. The track ways 113 adjacent their rear ends include an inclined portion 114 said inclined portion commencing shortly before the horizontal portion 108 of the track 106 is reached.

An endless flexible element 115 formed in part of sprocket chain 116 and in part of cable 117 is secured to the trough 99 as at 118 and is trained about rollers 119, the track 106, idler sprockets 120 120 and a drive sprocket 121 on the shaft 45. Obviously, as the upper flight of the element 115 moves forwardly the trough 99 will be moved forwardly on the trackways and as said upper flight of the element 115 moves rearwardly the trough will be returned to normal position. As above suggested the means for moving the trough 99 is set in operation by the bucket 28 on the return movement of the bucket.

A trip member 122 is pivotally arranged in the upper portion of the hood 23 and is so arranged as to be moved out of the way by the bucket 28 as the bucket moves to dumping position so that it will have no effect as it is pivoted at 122a. This member 122 includes a short arm or lip 123 to engage a corresponding arm or lip 124 on a lever 125 when the member 122 is moved in the opposite direction or is pressed downwardly by the bucket 28 as the bucket moves toward loading position. Movement is thus imparted to the arm 125 and as the arm swings forwardly it operates a push rod 126 which at its forward end (see Fig. 3) is connected with a bell crank lever 127. As the lever 127 is rocked it serves to shift downwardly a link 128 which in turn through a lever 129 pivoted at 130 shifts the clutch element 47 from a neutral position to a position to have it engage the clutch teeth of the gear 44 whereby the shaft 45 will be rotated and acting through the sprocket wheel 121 will drive the flexible member 115 in a manner to move the trough 99 forwardly in the truck body.

As the trough moves forwardly up the inclined portion 107 of the track 106 a roller 131 carried on an arm 132 engages the inclined portion 114 of the suspended track 113. Further movement of the bucket forwardly in the body 10 results in the roller 104 leaving the track 106. This, of course, is due to the fact that engagement between the roller 131 and the track 113 holds the trough in upright position. The trough is then drawn forwardly being supported on the horizontal portion 108 of track 106 by the roller 105 and on the track 113 by the roller 131, it being understood that the same action takes place at each end of the trough.

When the trough reaches its dumping position the rollers 105 engage the stops 109 and the rollers 131 leave the ends of the tracks 113 with the result that the trough swings from its upright to an inverted position as shown by the dot and dash lines in Fig. 1. As the trough swings to its inverted position it engages a lever member 133 pivoted as at 134 and connected intermediate its ends to the rear end of a push rod 135. At its forward end this push rod is pivotally secured as at 136 to an arm of a bell crank lever 137. To the other arm of this lever there is secured a vertically movable connecting member 138 connected as by a pin 139 with one arm of an operating member or lever 140. The arrangement is such that as the member 138 is forced downwardly member 140 is rocked on its pivot 141 to shift the clutch element 47 from engagement with the gear 44 into engagement with the gear 43 through connecting rod 140-a whereby the shaft 45 will be rotated in the opposite direction resulting in the flexible element 115 being moved in the opposite direction.

This reversal of movement will result in the trough 99 being carried toward the rear of the body or its normal position in an inverted condition. As the trough approaches the rear of the body 10 the roller 104 engages the branch inclined track way 111 and riding up on it engages and opens the one way gate element 110 and passes through. This, of course, results in an elevating of the front portion of the trough and the trough swings about into upright position ready to receive material on the next trip of the bucket 28.

When the trough returns to its normal position after a dumping trip it operates means to shift the clutch element 47 to a neutral position and to shift the clutch element 36 away from the clutch element 40. To this end a lever 142 projects inwardly through a side wall of the body and is pivoted intermediate its ends as at 143 and at its inner end carries a roller 144. As the trough drops into normal position it engages the roller 144 and swings the inner end of the lever 142 forwardly about its pivot 143. To the outer end of the lever 144 is pivotally secured a rod 145 which at its forward end is pivotally secured to an arm 146 on a rod or shaft 147 extending transversely along the front of the body. This rod 147 is through an arm 148 connected with the vertically shiftable member 138 heretofore referred to.

Operation of the member 138 upwardly as described results in the clutch element 47 on shaft 45 being moved from gear 43 to a neutral position whereby the shaft is no longer driven. Through a link 149 operation or movement of the rod 147 is transmitted to an arm 150 of a lever 151 in a manner to raise said arm or shift the same upwardly through the pin and slot connection 153. This lever 151 is pivoted as at 152. The other arm of lever 151 has connection with the clutch element 36 as at 154 and it will therefore be clear that as the arm 150 is moved upwardly about its pivot 152 the clutch element 36 is shifted downwardly away from the clutch element 40 and the shaft 37 is no longer driven from the shaft 34. The pin and slot connection 153 permits the link 138 to move downwardly under action of lever 133 while clutch member 36 is in engagement with clutch member 40.

On its return to loading position the bucket 28 operates means to shift the clutch element 55 to neutral position whereby the shaft 54 is no longer driven and the bucket remains stationary in loading position. This means includes a lever 155 pivoted as at 156 and having an arm 157 to the upper end of which is connected a pull rod 158. At its forward end this rod 158 is connected with an arm 159 (see Fig. 3) on a rotary rod 160 to which is also connected an arm 161 the outer end of which is connected with a pull rod 162 extending vertically along the front wall 20 of the body. As the bucket 28 returns to loading position it engages the lever 155 resulting in a downward pull on the rod 162 the upper end of which is pivotally connected with a lever 163 pivoted as at 164 and having an extension operating in the rear of the shaft 54 to shift the clutch 55 which is in engagement with gear 53 to neutral position. In order that the clutch element 55 may be initially shifted from neutral to operative position through manipulation of the hand lever 86 a lost motion yieldable spring connection 165 is provided in the push rod 158. Due to this connection movement of the lever 86 will not be transmitted to the rear portion of the rod 158 and it will not be necessary to shift the operating lever 155 against the weight of the bucket 128 when actuating the lever 86 as the spring will yield but has sufficient tension to operate the clutch under action of lever 155.

From the foregoing description it will be apparent that the loading mechanism of the present invention is to a large extent automatic in its operation. Moreover, the parts are so coordinated that the loading operation is quite rapid, requiring but about 30 seconds. After the bucket 28 has been loaded the levers 76 and 86 are operated to engage the respective clutches and all the remainder of the operation including the final disengagement of the clutches is automatic.

The bucket 28 empties into the trough 99 and on reaching dumping position the bucket operates lever 100 to bring about a shifting of the clutch element 55 whereby the direction of movement of the drums 70 is reversed and the bucket is started back to loading position. As the bucket moves toward loading position it engages the lever member 122 and through the mechanism described shifts the clutch element 47 into active position whereby the trough 99 is moved forward and dumped. As bucket 28 reaches loading position it operates lever 155 whereby clutch element 55 is shifted to neutral position and the bucket remains in loading position until the lever 86 is again operated. On reaching dumping position the trough 99 operates the lever 133 whereby to shift the clutch element 47 and reverse the direction of movement of the flexible means 115 resulting in the trough being returned to its normal position. As the trough moves into its normal position it operates the lever 142 resulting in the clutch element 47 being moved to neutral position and further resulting in the clutch element 36 being lowered into an inoperative position.

Having thus set forth the nature of my invention, what I claim is:

1. In a self loading truck, a body, a hood at the rear end of the body and open at its lower end and communicating at its upper end with the interior of the body, a bucket at the rear end of the body and operable through said hood from a loading position below the lower end of the hood to a dumping position at the upper end of the hood, means to operate the bucket between loading and dumping positions, a movable trough within the body and normally disposed within and adjacent the rear thereof in position to receive material dumped by said bucket, said trough movable between its normal position in the rear portion of the body and a dumping position in the forward portion of the body, and means to move the trough to its dumping position and return it to its normal position.

2. In a self loading truck, a body, a bucket at the rear of the body and operable between a loading position adjacent the lower end of the rear wall of the body and a dumping position at the top of said wall, means to operate said bucket between loading and dumping positions, a trough within the body and normally disposed within and adjacent the rear thereof in position to receive material dumped by said bucket, said trough movable between its normal position in the rear portion of the body and a dumping position in the forward portion of the body, and means to move the trough to its dumping position and return it to its normal position.

3. In a self loading truck, a body, a bucket at the rear of the body and operable between a loading position adjacent the lower end of the rear wall of the body and a dumping position at the top of said wall, means driven by power from the engine of the truck for operating said bucket between the loading and dumping positions, a shiftable trough within the body and normally disposed within and adjacent the rear thereof in position to receive material dumped by said bucket, said trough operable between its normal position in the rear portion of the body and a dumping position in the forward portion of the body, and means driven by power from the engine of the truck to move the trough to its dumping position and return it to its normal position.

4. In a self loading truck, a body, a bucket at the rear of the body, means to operate said bucket between loading and dumping positions, a trough within the body and normally disposed in the rear thereof to receive material dumped by said bucket, means to operate the trough between its normal position and a dumping position forwardly in the body, means operable by movement of the bucket toward loading position to set in operation the means for operating the trough, and means operated by the return of the trough to its position at the rear of the body to place the trough operating means in inactive condition.

5. In a self loading truck, a body having an entrance at the upper portion of its rear wall, a bucket at the rear of the body, means to operate said bucket between loading and dumping positions at the lower part of said rear wall and the entrance respectively, a trough within the body and normally disposed in the rear thereof in position to receive material dumped by said bucket, means to shift the trough between its normal position and a dumping position in the forward portion of the body, means to set in operation the means for operating the trough, and means to place the trough operating means in inactive condition.

6. In a self loading truck, a body, a drive shaft, a driven shaft, a clutch means for coupling and uncoupling said shafts, a bucket at the rear of the body, means operable from the driven shaft for moving the bucket between loading and dumping positions, a trough within the body and normally disposed at the rear thereof to receive material dumped by the bucket, means operable from said driven shaft for moving the trough between its normal position and a dumping position forwardly in the body, and means operable by the return of the trough to normal position to operate the clutch means to uncouple the shafts.

7. In a self loading truck, a body having an entrance at the upper portion of its rear wall, a bucket at the rear of the body, means to operate the bucket between loading position at the lower part of the rear wall and dumping position at said entrance, a trough within the body and normally disposed in the rear thereof in position to receive material dumped by the bucket, said trough shiftable between its normal position and an inverted dumping position in the forward portion of the body, means to move the trough in upright position from its normal to its dumping position where it is inverted and then return it to its normal position at the rear of the body, and means for returning the trough to its upright position during its movement toward the rear of the body.

8. In a self loading truck, a body, a bucket at the rear of the body, means to operate the bucket between loading and dumping positions, a trough within the body and normally disposed in the rear thereof to receive material dumped by the bucket, said trough operable between its normal position and an inverted dumping position forwardly in the body, a driven flexible means for moving the trough between normal and dumping positions, upper and lower track means, a pair of spaced rollers on the trough and engaging the lower track means to support the trough in upright position while in normal position, a roller on the trough and adapted to engage the upper track means and lift the first of said pair of rollers off the lower track means during movement of the trough toward dumping position, said roller adapted to pass off the upper track means when the trough reaches dumping position, said second pair of rollers pivoted to the trough whereby the latter may swing about the rollers and into an inverted dumping position, and said lower track means including means to engage the first of said pair of rollers and return the trough to upright position as the trough is moved toward normal position.

9. In a self loading truck, a body, a driven shaft, a bucket at the rear of the body, means operable from the driven shaft for raising the bucket from loading to dumping position, means operated by movement of the bucket to reverse the direction of said means operable from the driven shaft whereby said means lowers the bucket to loading position, manual means to place said bucket operating means in operation, and means operable by the bucket on its return to loading position to render said bucket operating means inactive.

10. In a self loading truck, a body, a driven shaft, a bucket at the rear of the body, a trough within the body and normally disposed in the rear thereof to receive material dumped by the bucket, means operable from the driven shaft for raising the bucket from loading to dumping position, means operated by the bucket in its movement at dumping position to reverse the direction of said means operable from the driven shaft whereby the means operates to lower the bucket to loading position, means operable from the driven shaft to move the trough from its normal position to a dumping position forwardly in the body, and means operated by the trough while dumping to reverse the direction of the means for moving the trough whereby said means returns the trough to normal position.

11. In a self loading truck, a body, a driven shaft, a bucket at the rear of the body, a trough within the body and normally disposed in the rear thereof to receive material dumped by the bucket, means operable from the driven shaft for raising the bucket from loading to dumping position, means operated by the bucket in its movement at dumping position to reverse the direction of said means operable from the driven shaft whereby the means operates to lower the bucket to loading position, means operable from the driven shaft to move the trough from its normal position to a dumping position forwardly in the body, means operated by the trough while dumping to reverse the direction of the means for moving the trough whereby said means returns the trough to normal position, and means operable by the trough on its return to normal position to render the trough moving means inactive.

12. In a self loading truck, a body, a driven shaft, a bucket at the rear of the body, a trough within the body and normally disposed in the rear thereof to receive material dumped by the bucket, means operable from the driven shaft for raising the bucket from loading to dumping position, means operated by the bucket in its movement at dumping position to reverse the direction of said means operable from the driven shaft whereby the means operates to lower the bucket to loading position, means operable from the driven shaft to move the trough from its normal position to a dumping position forwardly in the body, means operated by the bucket during its return to loading position to place the trough moving means in operation, and means operated by the trough while dumping to reverse the direction of the means for moving the trough whereby said means returns the trough to normal position.

13. In a self loading truck, a body, a driven shaft, a bucket at the rear of the body, a trough within the body and normally disposed in the rear thereof to receive material dumped by the bucket, means operable from the driven shaft for raising the bucket from loading to dumping position, means operated by the bucket in its movement at dumping position to reverse the direction of said means operable from the driven shaft whereby the means operates to lower the bucket to loading position, means operable from the driven shaft to move the trough from its normal position to a dumping position forwardly in the body, means operated by the bucket during its return to loading position to place the trough moving means in operation, means operated by the trough while dumping to reverse the direction of the means for moving the trough whereby said means returns the trough to normal position, and means operable by the trough on its return to normal position to render the trough moving means inactive.

14. In a self loading truck, a body, a drive shaft, a driven shaft, shiftable clutch means for coupling and uncoupling said shafts, manual means to shift said clutch means and couple said shafts, a bucket at the rear of the body, a trough within the body and normally disposed in the rear thereof to receive material dumped by the bucket, means operable from the driven shaft for raising the bucket from loading to dumping position, means operated by the bucket in its movement at dumping position to reverse the direction of said means operable from the driven shaft whereby the means operates to lower the bucket to lowering position, means operable from the driven shaft to move the trough from its normal position to a dumping position forwardly in the body, means operated by the trough while dumping to reverse the direction of the means for moving the trough whereby said means returns the trough to normal position, and means operable by the trough on its return to normal position to shift said clutch means and uncouple said shafts.

15. In a self loading truck, a body having an entrance at the upper portion of its rear wall, a trough within the body at the upper part of the rear end in front of said entrance, a bucket at the rear end of the body, means for raising the bucket to said entrance and dumping its contents into the trough, and means for moving the trough forwardly in the body and dumping its contents into the body.

16. In a truck, a body having a rear wall, a trough within the body and normally disposed adjacent the upper edge of the rear wall thereof to receive material dumped over said wall, said trough operable between its normal position and a dumping position forwardly in the body, means to move the trough to its dumping position and return it to its normal position, and said means adapted to move the trough in different horizontal planes as the trough is moved to and from dumping position whereby during its movement in one direction it will operate to distribute the load in the body.

17. In a self loading truck, a body, a bucket at the rear of the body, means to operate said bucket between loading and dumping positions, a trough within the body and normally disposed in the rear thereof to receive material dumped by said bucket, means to operate the trough between its normal position and a dumping position forwardly in the body, and means operable by movement of the bucket toward loading position to set in operation the means for operating the trough.

18. In a self loading truck, a body, a bucket at the rear of the body, means to operate the bucket between loading and dumping positions, a trough within the body and normally disposed in the rear thereof to receive material dumped by the bucket, said trough operable between its normal position and an inverted dumping position forwardly in the body, a driven flexible means for moving the trough between normal and dumping positions, upper and lower track means, a pair of spaced rollers on the trough and engaging the lower track means to support the trough in up-right position while in normal position, a roller on the trough and adapted to engage the upper track means and lift the first of said pair of rollers off the lower track means during movement of the trough toward dumping position, said roller adapted to pass off the upper track means when the trough reaches dumping position, the second of said pair of rollers pivoted to the trough whereby the latter may swing about the same and into an inverted dumping position, and means to return the trough to upright position as the trough is moved toward normal position.

19. In a self loading truck, a body, a hood at the rear end of the body and open at its lower end and communicating at its upper end with the interior of the body, a bucket at the rear end of the body and operable through said hood from a loading position below the lower end of the hood to a dumping position at the upper end of the hood, a trough within the body and normally disposed within and adjacent the rear thereof to receive material dumped by said bucket, said trough operable between its normal position in the rear portion of the body and a dumping position forwardly in the body, means to move the trough to its dumping position and return it to its normal position, and said means moving the trough in different horizontal planes as the trough is moved to and from dumping position whereby during its movement in one direction it will operate to distribute the load in the body.

20. In a self loading truck, a body, a bucket at the rear of the body and operable between a loading position adjacent the lower end of the rear wall of the body and a dumping position at the top of said wall, a trough within the body and normally disposed within and adjacent the rear thereof to receive material dumped by said bucket, said trough operable between its normal position in the rear portion of the body and a dumping position forwardly in the body, means to move the trough to its dumping position and return it to its normal position, and said means moving the trough in different horizontal planes as the trough is moved to and from dumping position whereby during its movement in one direction it will operate to distribute the load in the body.

21. In a self loading truck, a body, a bucket at the rear of the body and operable between a loading position adjacent the lower end of the rear wall of the body and a dumping position at the top of said wall, means driven by power from the engine of the truck for operating said bucket, a trough within the body and normally disposed within and adjacent the rear thereof to receive material dumped by said bucket, said trough operable between its normal position in the rear portion of the body and a dumping position forwardly in the body, means driven by power from the engine of the truck to move the trough to its dumping position and return it to its normal position, and said means moving the trough in different horizontal planes as the trough is moved to and from dumping position whereby during its movement in one direction it will operate to distribute the load in the body.

22. In a self loading truck, a body, a bucket at the rear of the body, means to operate said bucket between loading and dumping positions, a trough within the body and normally disposed in the rear thereof to receive material dumped by said bucket, means to operate the trough between its normal position and a dumping position forwardly in the body, said means moving the trough in different horizontal planes as the trough is moved to and from dumping position whereby during its movement in one direction it will operate to distribute the load in the body, means to set in operation the means for operating the trough, and means to place the trough operating means in inactive condition.

23. In a self loading truck, a body, a bucket at the rear of the body, means to operate the bucket between loading and dumping positions, a trough within the body and normally disposed in the rear thereof to receive material dumped by the bucket, said trough operable between its normal position and an inverted dumping position forwardly in the body, means to move the trough in upright position from its normal to its dumping position where it is inverted and then return it while inverted toward its normal position at the rear of the body, means for returning the trough to its upright position during its movement toward the rear of the body, and said trough while inverted extending downwardly into the body where during its return movement it may operate as a scraper to spread the load in the body.

24. In a self loading truck, a body, a trough within the body and having a normal position at the upper part of the rear end thereof, a bucket at the rear end of the body, means for raising the bucket and dumping its contents into the trough, means for moving the trough forwardly and dumping its contents into the body and then returning the trough to its normal position, and means whereby said trough extends into the body during its return movement whereby it may act as a scraper to spread the load in the body.

25. In a self loading truck, a body, a bucket at the rear of the body and operable between a loading position adjacent the lower end of the rear wall of the body and a dumping position at the top of said wall, a trough within the body and normally disposed within and adjacent the rear thereof to receive material dumped by said bucket, said trough operable between its normal position in the rear portion of the body and a dumping position forwardly in the body, means to move the bucket to its dumping position and return it to its loading position, and separate means to move the trough to its dumping position and return it to its normal position.

HENRY C. LIMA.